July 12, 1966   H. A. JAMES   3,260,476
PROPULSION UNIT WITH VECTORED THRUST CONTROL
Filed May 4, 1964   3 Sheets-Sheet 1

INVENTOR.
HARRY A. JAMES
BY
*Knox & Knox*

July 12, 1966  H. A. JAMES  3,260,476
PROPULSION UNIT WITH VECTORED THRUST CONTROL
Filed May 4, 1964  3 Sheets-Sheet 2
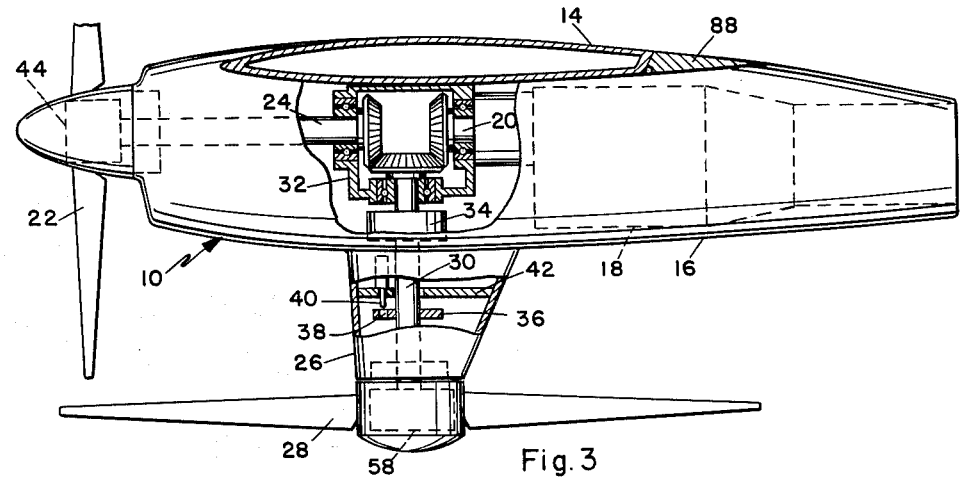
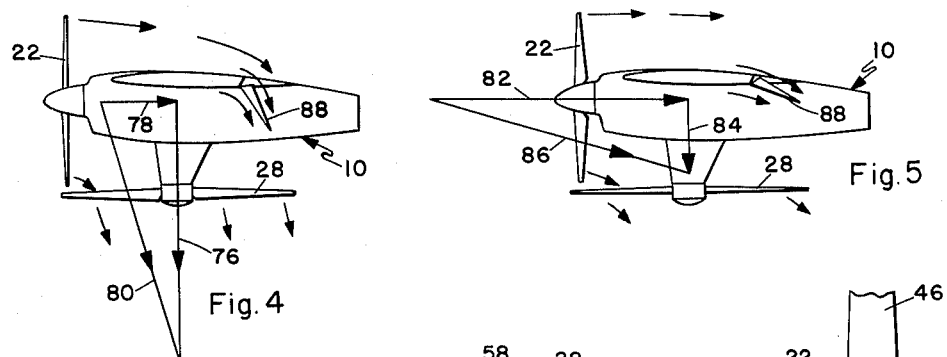
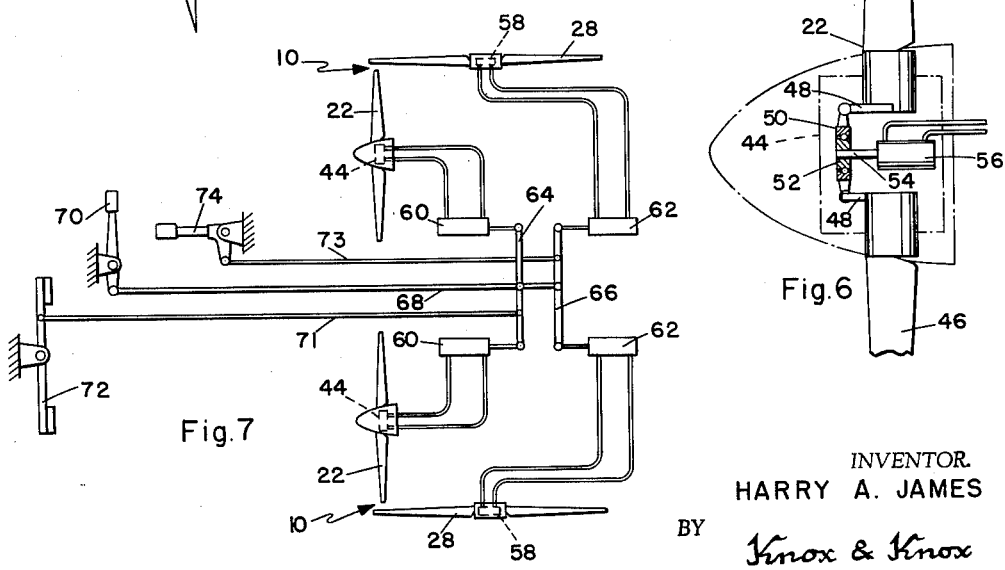
INVENTOR.
HARRY A. JAMES
BY
Knox & Knox INVENTOR.
HARRY A. JAMES
BY Knox & Knox

United States Patent Office 3,260,476
Patented July 12, 1966

3,260,476
PROPULSION UNIT WITH VECTORED
THRUST CONTROL
Harry A. James, San Diego, Calif., assignor to The Ryan
Aeronautical Co., San Diego, Calif.
Filed May 4, 1964, Ser. No. 364,408
6 Claims. (Cl. 244—7)

The present invention relates to propulsion and more specifically to a propulsion unit with vectored thrust control.

While the propulsion unit may be used on various types of vehicles moving in a fluid medium, it is particularly adaptable to aircraft and, for convenience, will be described as primarily an aircraft propulsion unit.

In aircraft designed for vertical, or short take-off and landing characteristics (VTOL or STOL), various systems have been evolved to provide thrust in the necessary direction to achieve the required direction of motion. One example is the tilting propeller or fan system in which the propellers or ducted fans are pivotally mounted to swing from a vertical thrust position to a horizontal thrust position. In some cases the entire wing with the engines thereon is made to tilt. These arrangements require heavy and complex actuating and drive mechanisms. Another system uses large multiple flaps to deflect thrust from fixed propellers, which involves a very complex wing structure and considerable actuating mechanism.

It is a primary object of the present invention to provide a propulsion unit incorporating a pair of propellers having fixed axes of rotation, one providing generally horizontal thrust and the other generally vertical thrust, mounted in such a manner that, by proportional control of thrust of the two propellers inversely, the resultant thrust vector can be directed at any angle between horizontal and vertical, and even forward to some degree.

Another object of this invention is to provide a propulsion unit wherein, for high speed forward motion, the vertical thrust propeller can be stopped in a minimum drag position.

A further object of this invention is to provide a propulsion unit wherein the propellers are interconnected, so that the full available power is used at all times while the proportion of thrust of each propeller is varied.

Another object of this invention is to provide a propulsion unit which can be driven by various types of power sources, according to the particular use.

In the drawings

FIGURE 3 is an enlarged side elevation view, partially cut away, of one propulsion unit;

FIGURE 4 is a diagram of the propulsion unit in the near vertical thrust position;

FIGURE 5 is a diagram of the propulsion unit in the near horizontal thrust position;

FIGURE 6 is a diagrammatic view of a typical propeller pitch change mechanism;

FIGURE 7 is a diagram of the thrust vector control system;

Basic propulsion unit

Figure 1:
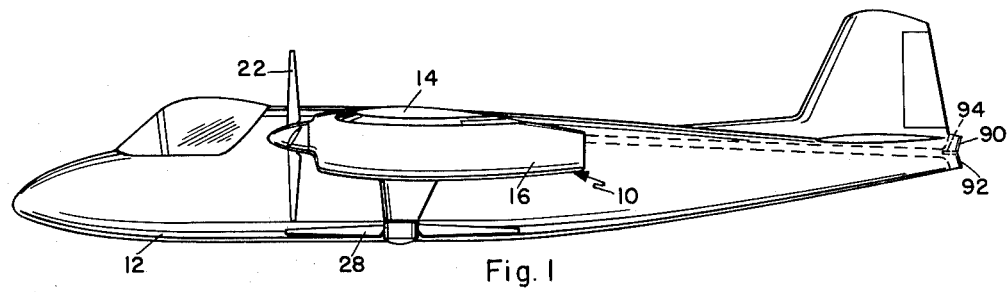
FIGURE 1 is a side elevation view of a typical aircraft incorporating the propulsion unit.
Figure 2:
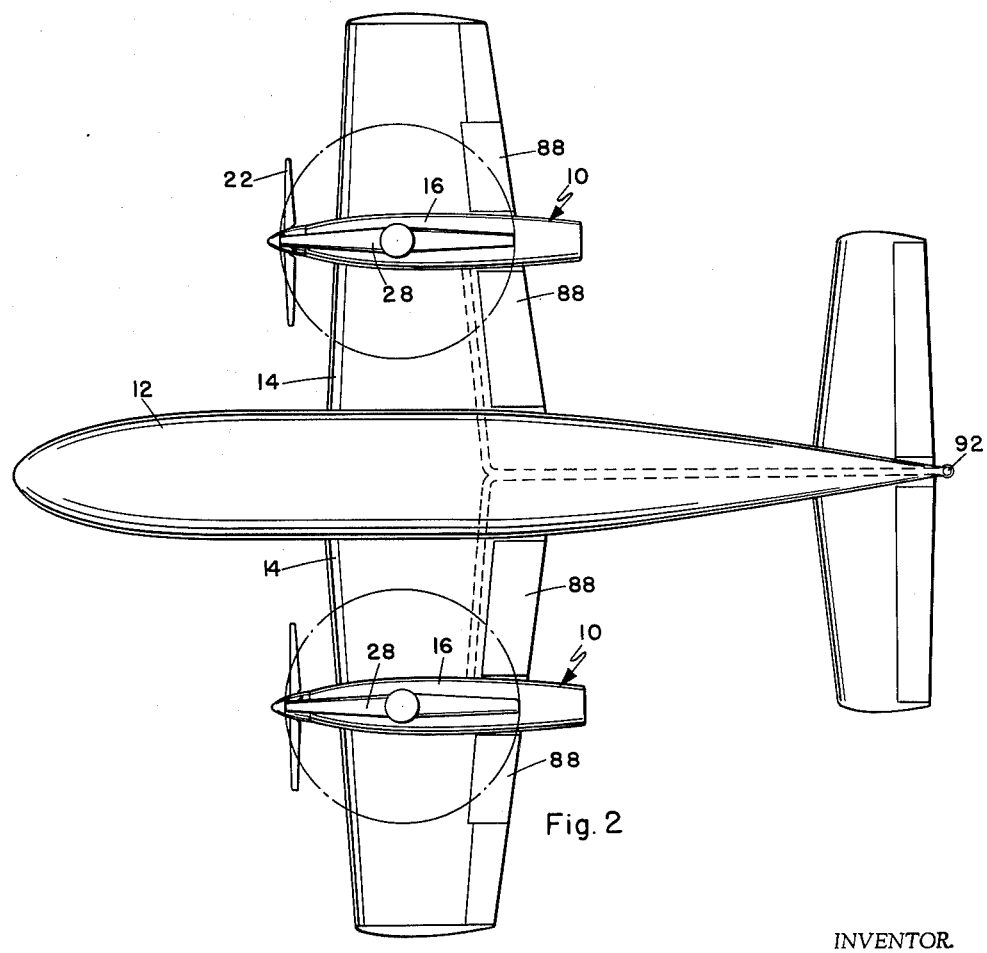
FIGURE 2 is a bottom plan view of the aircraft.

In FIGURES 1–3 the propulsion unit, generally indicated at 10, is illustrated as adapted to a conventional type of aircraft 12 having a wing 14, with a propulsion unit mounted on each side in a twin engined configuration.

The propulsion unit 10 comprises a nacelle 16 in which is mounted an engine 18 of suitable type, that illustrated being a turbine engine with an output shaft 20. At the forward end of nacelle 16 is a propulsion propeller 22 having a propeller shaft 24 rotatable on an axis substantially parallel to the longitudinal axis of the aircraft. Extending downwardly from nacelle 16 is an aerodynamically contoured pylon 26, at the lower end of which is a lift propeller 28 on a shaft 30 perpendicular to propeller shaft 24. Lift propeller 28 is larger in diameter than propulsion propeller 28 and overlaps slightly below the latter. It has been found that the spacing of the lift propeller 28 below the wing 14 should be about one third of the propeller diameter, or about one half of the wing chord. However, the spacing will vary somewhat depending on the particular propeller design, the wing configuration and airfoil and the performance requirements of the aircraft.

The two propellers 22 and 28 are thus on fixed orthogonal axes and are driven from a common gearbox 32 coupled to engine output shaft 20, a simple bevel gear arrangement being shown in FIGURE 3 as an example. The axis of lift propeller 28 is preferably at or near the longitudinal center of gravity of the aircraft, so that pitching moments are minimized during lifting thrust. A clutch 34 is incorporated into shaft 30 so that lift propeller 28 can be disengaged in high speed forward flight. To minimize drag of the lift propeller 28 at high speed, a two-bladed propeller is used as indicated in FIGURE 2, the propeller being stopped with the blades parallel to the airflow. Various means may be used to stop the lift propeller in the correct position, the simple arrangement in FIGURE 3 including a stop plate 36 fixed to shaft 30 and having a socket 38 which is engaged by a telescopic plunger 40 mounted on a fixed support 42 in the pylon 26.

Control system

Propulsion propeller 22 has a pitch control unit 44, an example being illustrated in FIGURE 6. The propeller blades 46 are mounted in suitable radial bearings, not shown, and are provided with arms 48 which are coupled to a control ring 50 coaxial with the propeller rotational axis. Within control ring 50 is a bearing 52 secured to the piston 54 of an actuating cylinder 56, by which the control ring can be moved axially, so turning the blades 46 and varying the pitch. Many other such mechanisms are well known, the specific type used not being critical. Lift propeller 28 also has a pitch control unit 58 similar to that described, providing individual pitch control of the propellers.

The control system for the twin propulsion units of the aircraft is illustrated in FIGURE 7. As illustrated, each pitch control unit 44 is operated by an actuator 60 and each pitch control unit 58 is operated by an actuator 62. The actuators 60 are interconnected by a coupling bar 64 and actuators 62 are similarly connected by a coupling bar 66. Both coupling bars 64 and 66 are pivotally attached at their centers to a control rod 68 leading to a collective control handle 70. Motion of handle 70 moves both coupling bars 64 and 66 and changes the pitch of propellers 22 in one direction, while simultaneously changing the pitch of propellers 28 in the opposite direction. Connected to coupling bar 64 at one side of its central pivot is a yaw control rod 71 operated by yaw control pedals 72, which may be the rudder pedals of the conventional aircraft control. Connected to coupling bar 66 at one side of its central pivot is a roll control rod 73 leading to a roll control handle 74, which can be the pilot's control stick as used for aileron control. When control handle 74 is moved, the coupling bar 66 is caused to swing about its connection to control rod 68 and move actuators 62 in opposite directions for differential pitch control of the propellers 28. Similarly, motion of pedals 72 will provide differential pitch change of propellers 22. Other control systems with various mechanical, electrical or fluid components may be used, that illustrated merely being an example.

Vectored thrust action

The thrust vectoring action is illustrated in two conditions in FIGURES 4 and 5. In the high lift configuration of FIGURE 4, the lift propeller 28 is in high pitch position and propulsion propeller 22 is in low pitch. The high downward thrust, indicated at 76, and the small rearward thrust 78, will result in a thrust vector 80 directed downwardly and slightly to the rear, as shown by the vector triangle. The thrust of lift propeller 28 can be increased maximum and the thrust of propeller 22 reduced to zero or near zero to provide vertical thrust, enabling the aircraft to take-off vertically.

When the aircraft is clear of the ground, the thrust ratios are changed to increase rearward thrust and decrease downward thrust, imparting a forward motion to the aircraft.

In FIGURE 5 the vector diagram shows a large rearward thrust 82 and a small downward thrust 84, resulting in a thrust vector 86 which is directed to the rear and slightly down. By further increasing the pitch of propellers 22 and reducing the pitch of propellers 28 to zero, the aircraft is brought to high speed flight condition, the lift propellers being stopped in minimum drag position.

It will be evident that thrust vector can be varied over a wide range to suit particular flight requirements. By extending the range of pitch control of propellers 22 to include reverse pitch, the thrust vector can even be directed forward to some degree to provide control in hovering flight. This is all accomplished without moving the rotational axes of the propellers.

When the propulsion unit is used in conjunction with the aircraft wing 14, as illustrated, the airflow also increases the lift over the wing, particularly in low speed or vertical flight. The wing is provided with trailing edge flaps 88 of normal size actuated by any well known means, it being unnecessary to have large or compound flaps. The vectored airflow, as indicated by directional arrows in FIGURES 4 and 5 is deflected by flap 88 in the general direction of the effective thrust vector and, in doing so, entrains airflow down over the upper wing surface and over the flap. The overall effect is that of a jet flap or blown flap, the principles of which are well known, without resorting to the air ducting in the wing normally used to obtain these results.

In addition to providing vectored thrust to propel the aircraft in vertical or horizontal flight, or at any intermediate stage, the control system permits considerable maneuvering of the aircraft in hover and at low speeds. Yaw or directional control is obtained by differential pitch control of propellers 22 through pedals 72, to cause unequal rearward thrust. Roll or lateral control is obtained by differential pitch control of lift propellers 28, producing unequal lift on opposite sides and causing the aircraft to roll.

Longitudinal pitching motion of the aircraft in hovering and at low speeds can be provided in various ways, such as by the opposed reaction nozzles 90 and 92 at the tail of the aircraft, as in FIGURES 1 and 2. Gas is bled from engines 18 and is ejected upwardly and downwardly from the nozzles, a valve 94 being installed between the nozzles to control flow up or down and provide the required thrust reaction. Valve 94 can be coupled to the aircraft's elevator controls to provide continuous control through all flight phases, the reaction nozzle system being well known. Other means such as ducted fans or small propellers can be used at the nose or tail of the aircraft instead of reaction nozzles, for longitudinal pitch action when the aerodynamic surfaces are ineffective.

Alternative power system

Figure 8:
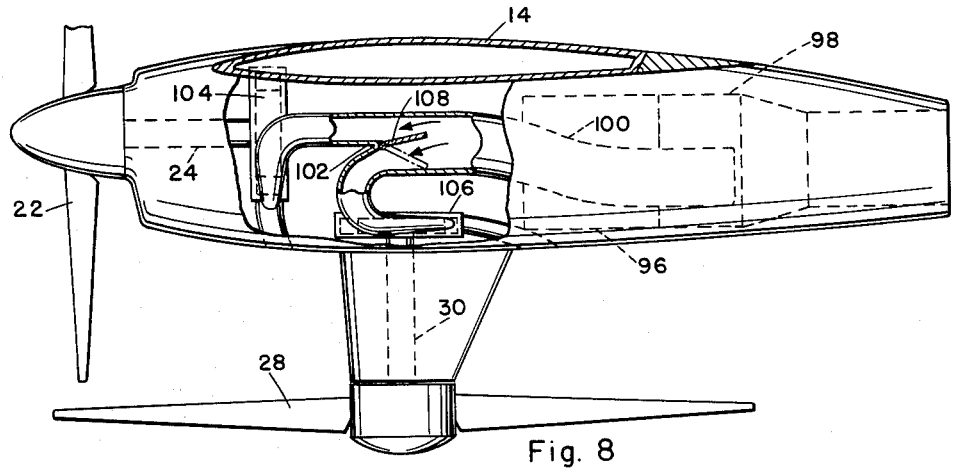
FIGURE 8 is a side elevation view of a propulsion unit showing an alternative drive means.

The direct gear drive with propeller pitch control is adequate for most purposes, but it may be desirable in some instances to control propeller rotation speed as well as pitch. This can be accomplished by the arrangement illustrated in FIGURE 8, in which the engine 96 is of the type having a gas generator portion 98, from which a duct 100 is extended to supply pressurized gases to auxiliary drives and the like. In this case the duct 100 has a bifurcated portion 102, one side of which leads to a turbine 104 on the shaft 24 of propeller 22, the other side leading to another turbine 106 on the shaft 30 of propeller 28. Thus the propellers are individually turbine driven and are controlled by a valve 108 pivotally mounted in bifurcated portion 102 to vary the amount of gas to each turbine. Valve 108 can be operated by any suitable control, or could be coupled to the propeller pitch control system in a suitable manner, such as to control rods 68, 71 and 73, so that power to a particular propeller is in proportion to the pitch and the resultant power requirement of the propeller.

Other uses

Figure 9:
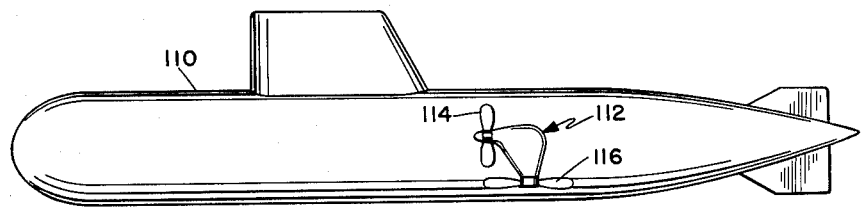
FIGURE 9 is a side elevation view of a submarine incorporating the propulsion unit.

The propulsion unit is not limited to use on aircraft, but is effective for other vehicles operating in a fluid medium. For instance, FIGURE 9 illustrates a submarine 110 fitted with propulsion units 112 of the type described herein, adapted for marine use, with the proper propellers 114 and 116 for longitudinal and vertical thrust respectively. With a propulsion unit on each side the submarine would be exceptionally maneuverable and would be ideal for undersea exploration.

Figure 10:
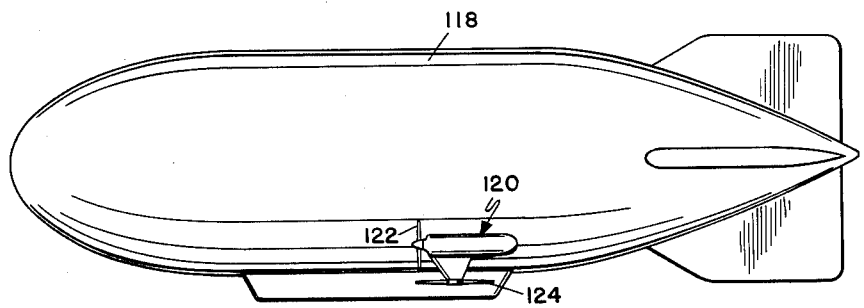
FIGURE 10 is a side elevation view illustrating the propulsion unit as applied to a lighter-than-air craft.

Another example is the lighter-than-air craft or blimp 118 shown in FIGURE 10, with a propulsion unit 120 having a propulsion propeller 122 and a lift propeller 124. A similar unit would be carried on each side. Such craft are virtually uncontrolled at very low speeds, as during take-off and landing, and are usually handled from the ground by ropes. The propulsion units would provide control at all speeds and would allow the blimp to hover or remain stationary, even in a wind.

It will be evident that a very wide range of control is available in a variety of applications with a simple arrangement of propellers rotating on fixed axes. With sufficient power available the propulsion units could be used on a wingless aircraft, providing constant support in the manner of a helicopter.

It is understood that minor variation from the form of the invention disclosed herein may be made without departure from the spirit and scope of the invention, and that the specification and drawings are to be considered as merely illustrative rather than limiting.

I claim:

1. In combination with an aircraft having a wing, a propulsion unit comprising:
    a propulsion propeller mounted forwardly of said wing to rotate about fixed axis substantially parallel to the longitudinal axis of the aircraft;
    a lift propeller mounted below said wing to rotate about a substantially vertical axis;
    said propellers having variable pitch blades;
    thrust vector control means connected to said propellers to vary the blade pitch of one propeller simultaneously with and inversely to the blade pitch of the other propeller;
    and a source of power connected to drive said propellers.

2. In combination with a vehicle for operation in a fluid medium:
    a pair of propulsion units mounted on opposite sides of the vehicle;
    each of said propulsion units including a propulsion propeller rotatable about an axis substantially parallel to the longitudinal axis of the vehicle, and a lift propeller rotatable about an axis substantially perpendicular to the axis of said propulsion propeller;

said propellers having variable pitch blades;

thrust vector control means connected to said propellers to vary the blade pitch of one propeller of each unit inversely to the blade pitch of the other propeller of the same unit;

and a source of power connected drive said propellers.

3. The combination of claim 2 and further including yaw control means connected to said propulsion propellers to vary the blade pitch thereof differentially.

4. The combination of claim 3 and further including roll control means connected to said lift propellers to vary the blade pitch thereof differentially.

5. A propulsion unit, comprising:

a supporting structure;

a propulsion propeller mounted on said structure to rotate about a substantially horizontal fixed axis;

a lift propeller mounted on said structure to rotate about a substantially vertical fixed axis;

said propellers having variable pitch blades;

thrust vector control means connected to said propellers to vary the blade pitch of one propeller simultaneously with and inversely to the blade pitch of the other propeller;

said lift propeller having a pair of opposed blades;

means to stop said lift propeller with the blades thereof substantially parallel to the rotational axis of said propulsion propeller;

and a source of power connected to drive said propellers.

6. A propulsion unit according to claim 5, wherein said lift propeller extends below said propulsion propeller.

References Cited by the Examiner

UNITED STATES PATENTS

| 1,560,899 | 11/1925 | Dornier | 244—6 |
| 1,930,199 | 10/1933 | Hanson | 244—5 |
| 2,225,002 | 12/1940 | Focke | 170—135.22 X |
| 2,698,147 | 12/1954 | Hovgard | 170—135.24 X |
| 2,837,307 | 6/1958 | Jenny | 244—7 |
| 3,185,408 | 5/1965 | Higgins | 244—7 |

MILTON BUCHLER, *Primary Examiner.*

ALFRED E. CORRIGAN, *Examiner.*